United States Patent
Heinz, Jr.

[11] Patent Number: 6,051,337
[45] Date of Patent: Apr. 18, 2000

[54] MINIATURE GALVANIC CELL HAVING OPTIMUM LOW SURFACE AREA CONDUCTIVE COLLECTOR

[75] Inventor: Henry Heinz, Jr., Sheffield Lake, Ohio

[73] Assignee: Eveready Battery Company, Inc., St. Louis, Mo.

[21] Appl. No.: 08/970,683

[22] Filed: Nov. 14, 1997

[51] Int. Cl.⁷ .................................................. H01M 2/08
[52] U.S. Cl. ........................ 429/174; 439/185; 29/623.2
[58] Field of Search ........................... 429/101, 157, 429/163, 174, 127, 27, 166, 168, 169, 171, 185, 172; 29/623.1, 623.2

[56] References Cited

U.S. PATENT DOCUMENTS

| | | | |
|---|---|---|---|
| 4,041,211 | 8/1977 | Wiacek | 429/36 |
| 4,302,517 | 11/1981 | Dziak . | |
| 5,500,026 | 3/1996 | Heller et al. | 429/157 |
| 5,576,117 | 11/1996 | Morita . | |
| 5,618,640 | 4/1997 | Idota et al. | 429/218.1 |
| 5,662,717 | 9/1997 | Burns | 29/623.1 |

FOREIGN PATENT DOCUMENTS

| | | |
|---|---|---|
| 0298690 | 1/1989 | European Pat. Off. . |
| 2304182 | 10/1976 | France . |
| 0152235 | 11/1981 | Germany . |
| 4325628 | 2/1995 | Germany . |
| 09199187 | 7/1997 | Japan . |
| 1536498 | 12/1978 | United Kingdom . |
| WO 99/26302 | 5/1999 | WIPO . |

Primary Examiner—Maria Nuzzolillo
Assistant Examiner—Susy Tsang
Attorney, Agent, or Firm—Russell H. Toye, Jr.; Robert W. Welsh

[57] ABSTRACT

A miniature galvanic cell employing a cup-insulating member-current collector assembly, preferably a plastic insulating member and low surface area current collector, to prevent or minimize the formation of gases, such as hydrogen, on the current collector member. A process for producing such a cell is also disclosed.

20 Claims, 3 Drawing Sheets

MINIATURE GALVANIC CELL HAVING OPTIMUM LOW SURFACE AREA CONDUCTIVE COLLECTOR

FIELD OF THE INVENTION

This invention relates to a miniature type of galvanic cell employing an insulating member and current collector assembly, such as a rigid plastic member and low surface area conductive current collector member, to prevent or minimize the formation of gases such as hydrogen on the sites on the current collector member. This invention also relates to a process for producing a miniature galvanic cell having a low surface area conductive current collector.

BACKGROUND OF THE INVENTION

The miniaturization of electronic devices has created a demand for small but powerful electrochemical cells. Cells that utilize an alkaline electrolyte are known to provide high energy density per unit volume and are therefore well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell cup and can so as to provide a seal for the cell. Generally, the gasket must be made of a material inert to the electrolyte contained in the cell and the cell environment. In addition, it must be flexible and resistant to cold flow under the pressure of the seal and maintain these characteristics so as to insure a proper seal during long periods of storage. Materials such as nylon, polypropylene, ethylene-tetrafluoroethylene copolymer and high density polyethylene have been found to be suitable as gasket materials for most applications. Typically, the insulating gasket is in the form of a J-shaped configuration in which the extended wall of the cup is inserted so that upon being radially squeezed, the gasket forms a seal for the cell. The gasket generally extends the entire length of the internal wall of the cell. The volume of the gasket is generally in excess of 20% of the internal volume of the cell and therefore results in a waste of space in the cell for the active components of the cell. To better insure a good seal, a sealant is generally applied to the gasket, including its U-shaped groove, so that upon insertion of the cup into the gasket the edge of the extended wall of the cup will seat in the sealant, and then upon the application of a radial squeeze, the gasket will be compressed against the edge of the extended cup wall.

U.S. Pat. No. 4,302,517 discloses a sealed galvanic cell employing an insulating gasket between the can and the cup of the cell. The cell is composed of a first sealing segment disposed and compressed between the rim of the can and the edge of the cup and a second can support segment extending within the cup and substantially parallel to the wall of the cup and defining a plurality of spaced apart openings which accommodate the cell's electrolyte and/or the cell's reaction product.

In conventional zinc alkaline cells, the zinc component contacts the terminal, which generally has a large surface area. The zinc in the cells, preferably mercury free cells, forms reactive gases, such as hydrogen, which are detrimental to the proper operation of the cells.

It is an object of the present invention to provide a miniature cell structure that employs an insulating member and current collector assembly, such as a rigid plastic member with a low surface area current collector member.

It is another object of the present invention to provide a current collector member with a minimum surface area to prevent or minimize the formation of gases, such as hydrogen, on the current collector member.

It is another object of the present invention to provide an insulator for a miniature cell in which the insulator has a groove to accommodate the peripheral flange of the cup of the cell's housing to provide a sealed miniature cell.

It is another object of the present invention to provide a process for producing a miniature cell with a novel insulator and current collector assembly.

The foregoing and additional objects of the present invention will become more fully apparent from the following description and accompanied drawings.

DESCRIPTION OF THE INVENTION

The invention relates to a galvanic cell having: (a) two electrodes of opposite polarity, a separator between the electrodes and an electrolyte, all contained within a two-part conductive housing, one part of which is a can which is electrically connected to the first electrode and the other part of which is a flanged cup which is electrically connected to the second electrode; (b) an insulating member having a base segment, an inner wall and a peripheral wall which define an internal surface area that contacts the second electrode, where the peripheral wall of the insulating member is disposed adjacent the wall of the can and the cup, and the edge of the can is sealed against the insulating member, securing the can to the insulating member to seal the cell; and (c) a current collector member extending through the opening in the base segment of the insulating member and electrically contacting the second electrode at one end and electrically contacting the cup at the other end, such that the portion of the surface area of the current collector that is disposed within the second electrode is less than 25% of the insulating member's internal surface area.

The invention also relates to a galvanic cell having: (a) two electrodes of opposite polarity, a separator between the electrodes and an electrolyte, all contained within a two-part conductive housing, one part of which is a can which is electrically connected to the first electrode and the other part of which is a flanged cup which is electrically connected to the second electrode; (b) an insulating member having a base segment, an inner wall and a peripheral wall, where the flange of the cup is secured in a groove in the peripheral wall of the insulating member, the peripheral wall is adjacent the wall of the can, and the edge of the can is sealed against the insulating member, thus securing the can to the insulating member and sealing the cell; and (c) a current collector member extending through the opening in the base segment of the insulating member and electrically contacting the second electrode at one end and electrically contacting the cup at the other end.

The insulating member is generally made of a material inert to the electrolyte and active components contained in the cell and therefore these materials of the cell do not react on the surface of the insulating member. It is necessary that this current collector make contact with one of the electrodes and one of the external terminals of the cell. To minimize the reactive surface area of the current collector, the insulating member is formed as a cup to contain one of the electrodes and to insulate that electrode from the other terminal connected to the other electrode. The current collector can be a wire, a nail, a cylinder member or any small volume member to provide minimum surface area for the components of the electrode, such as zinc, and thereby minimize the sites available for forming reactive gases, such as hydrogen. Preferably the surface area of the current collector should be less than 25% of the surface area defining the internal area of the insulating member that contacts the electrode, such as a zinc electrode, more preferably less than 10%, more preferably yet less than 7%, and most preferably less than 5% of the internal surface area of the insulating member.

In one embodiment of the invention, the current collector could be a wire or any other small surface area member secured to the external terminal of the cell, or the current collector member could also perform as the external terminal of the cell. In the latter embodiment of the invention, the cup of the cell could be a unitary member containing the current collector or the current collector could be a unitary member functioning as the external terminal of this cell. As used herein, the cup and the current collector could be only one member or preferably the cup and current collector could be two members.

In one embodiment of the invention, the insulating member preferably should have a base segment, an inner wall defining an opening in the base segment, a peripheral wall having a groove disposed therein to accommodate the flange of the cup.

The insulating member is preferably a tube having an essentially closed end and said tube made of a unitary solid material sufficient in thickness to insure that the inner surface of the wall of the cup will be electrically insulated from the wall of the can.

In one of the embodiments of this invention, the electrically insulating member would be disposed adjacent to the inner surface of the can's wall, and a sealant, such as an adhesive, could be disposed between the inner surface of the can's wall and insulating member and/or between the flange of the cup and the groove in the insulating member. The material for the electrically insulating member could be made of materials such as synthetic rubber, such as polychloroprene (neoprene and viton); vinylidene fluoride resin, such as KYNAR, a trademark of Pennwalt Chemicals Corp.; polyamide resins, such as nylon; polyolefin; polyvinyl chloride (PVC); silicone; tetrafluoroethylene polymer, such as TEFLON, a trademark of E. I. DuPont de Nemours; polypropylene; and any other similar rigid material.

In another embodiment of this invention, the insulating member could be a unitary structure or could be composed of two or more segments to provide a unitary structure.

Another embodiment of this invention relates to a process for assembling the components of a cell into a two-part conductive housing, in which one part is a cup and the other part is a can, including the steps:

(a) preparing a conductive can having a peripheral wall terminating with an edge defining an opening;

(b) preparing an insulating member having a base segment, a peripheral wall, an inner wall defining an opening, a groove in the peripheral wall of the insulating member, and inner and outer surfaces;

(c) preparing a conductive cup with a peripheral flange;

(d) placing a current collector within and through the opening in the insulating member and securing the cup within the groove in the insulating member;

(e) placing the components of the cell, including at least two electrodes and an electrolyte, within the can and cup so that the wall of the can is in parallel alignment with the peripheral wall of the insulating member; and (f) securing the wall of the can against the wall of the insulating member to produce a sealed cell.

Preferably the electrically insulating member in step (b) would have the peripheral wall extended to contact the electrode which is electrically connected to the can so that the electrode electrically connected to the cup via the current collector is insulated from the can.

Typical cell systems in which this invention can be used are alkaline manganese dioxide cells, air depolarized cells, nickel-cadmium cells and silver oxide-zinc cells.

The cup for the cell of this invention could be made of monel, clad stainless steel, or some other conductive materials, The can should be made of a conductive material that will not corrode or otherwise deteriorate when in contact with the materials of the cell. The can for the cell could be made of stainless steel, nickel, nickel-plated steel, or some other conductive materials.

The current collector can be made from a conductive material such as copper, brass, monel or the like,

BRIEF DESCRIPTION OF THE DRAWINGS

The present invention will become apparent from the following description thereof when considered together with the accompanying drawings which are set forth as being exemplary of embodiments of the present invention and are not intended, in any way, to be limitative thereof and wherein.

DETAILED DESCRIPTION OF THE DRAWINGS

Figure 1:
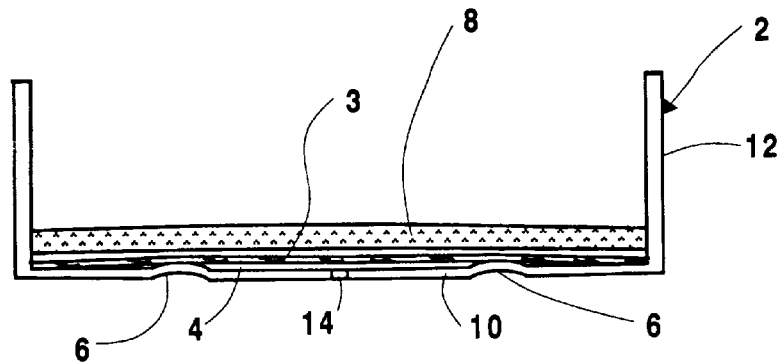
FIG. 1 is a cross-sectional view of an air electrode in a can.

FIG. 1 shows a circular can 2 with an air distribution membrane 4 secured to the inner surface of the can 2. A layer of polytetrafluoroethylene 3 covers the entire bottom of the can 2 including the air distribution membrane 4. The can 2 has patterned internal embossed sections 6 (optional) to provide a defined gap for uniform air distribution across the surface of an electrode 8 which is disposed within can 2. As shown in FIG. 1, the can comprises a base 10 abutting a peripheral upstanding wall 12 and disposed in base 10 is an opening 14. The electrode assembly containing the membrane 4, polytetrafluoroethylene layer 3, and electrode 8 disposed on the base 10 of can 2.

Figure 2:
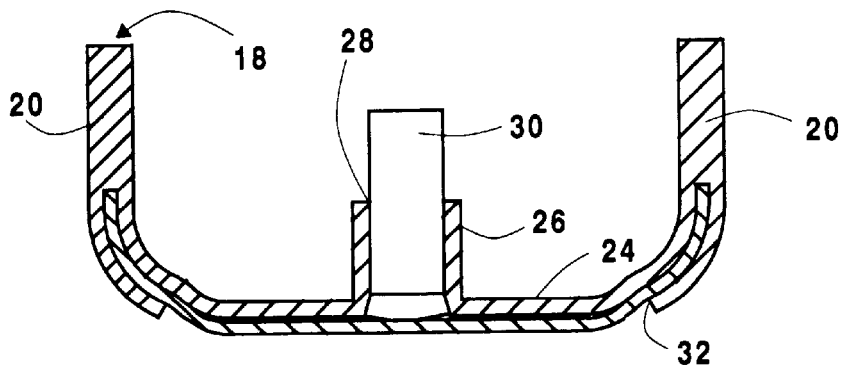
FIG. 2 is a cross-sectional view of a cup, an insulating member and a current collector member for use in this invention.
Figure 3:
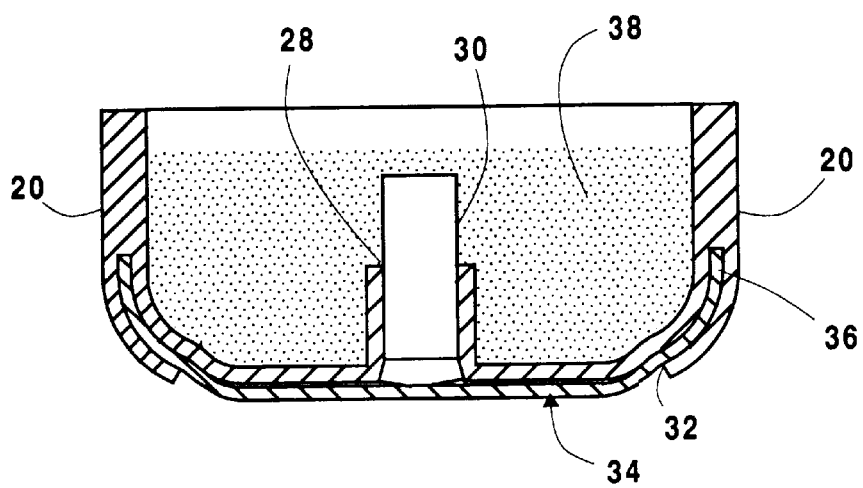
FIG. 3 is a cross-sectional view of the insulating member of FIG. 2 containing the current collector member, cup and negative electrode in accordance with this invention.

FIGS. 2 and 3 show an insulating member 18 with a peripheral upstanding wall 20, a base segment 24 and an internal upstanding wall 26 defining an opening 28. A current collector 30 is secured within opening 28. A groove 32 is disposed in the wall segment 20 of insulating member 18. A cup 34 having a peripheral flange 36 is disposed in groove 32 and is in physical contact with current collector 30 so that cup 34 functions as a terminal for the cell. The insulating member 18 is shown with a negative electrode 38 of zinc powder, placed in the insulating member and making electronic contact with the cup 34 via current collector 30. The negative electrode mixture 38 can contain a mixture of zinc particles, electrolyte and organic compounds such as binders which make up the battery's negative electrode 38. The cup 34 can be made from nickel, nickel plated steel, nickel plated stainless steel, nickel clad stainless steel and the like. A nickel layer could be used on the exterior surface of the steel strip to increase electrical conductance or electrical contact to a device using the battery.

Other laminated materials from which the cup may be made include: a bilaminate on a stainless steel substrate or a laminate made from more than three layers. Round disks punched from this laminated metal strip are then formed into a cup. The copper layer forms the inside surface of the cup and directly contacts the current collector 30.

Figure 2A:
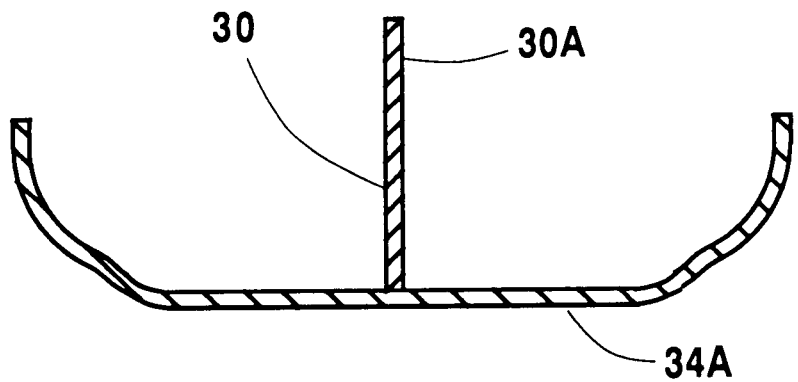
FIG. 2A is a cross-sectional view of another embodiment of a current collector member for use in this invention.
Figure 2B:
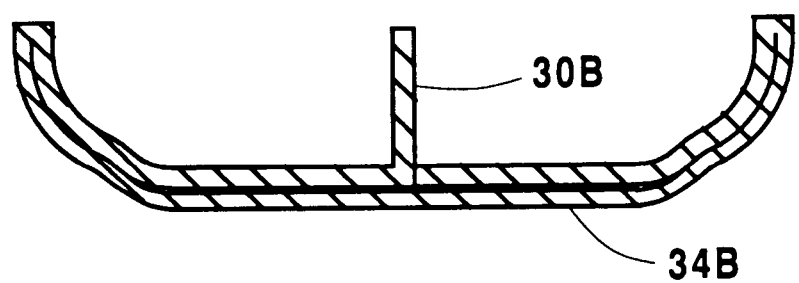
FIG. 2B is a cross-sectional view of another embodiment of a unitary current collector member for use in this invention.

The current collector 30 could be a wire or nail 30A (shown in FIG. 2A) or any low volume member that could be disposed in the negative electrode mixture 38 and contact the cup 34A. The conducting wire or nail 30A should be electrically secured to cup 34A using any conventional techniques. In FIG. 2B the cup 34B is shown as a simple sheet of conductive material folded to produce a center protruding conductive segment 30B that functions as the current collector.

Figure 4:
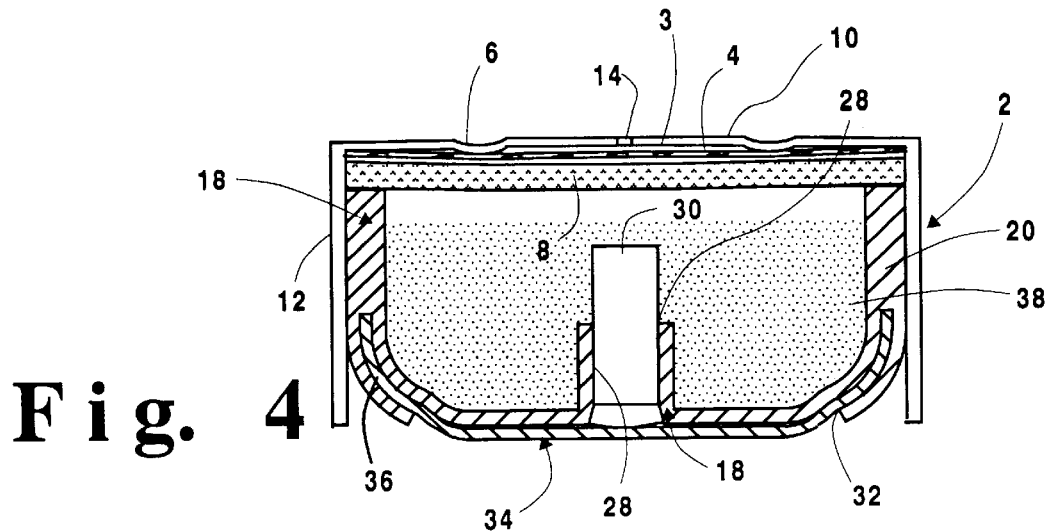
FIG. 4 is a cross-sectional view of the can and an electrode of FIG. 1 that is inverted and then placed over the open end of the insulating member of FIG. 3.

As shown in FIG. 4, the can 2 along with the inserted electrode assembly is inverted over the insulating member 18 which is preassembled according to this invention and contains negative electrode 38. The flange 36 of the cup 34 is disposed within groove 32 of insulating member 18 and rests on the current collector 30.

Figure 5:
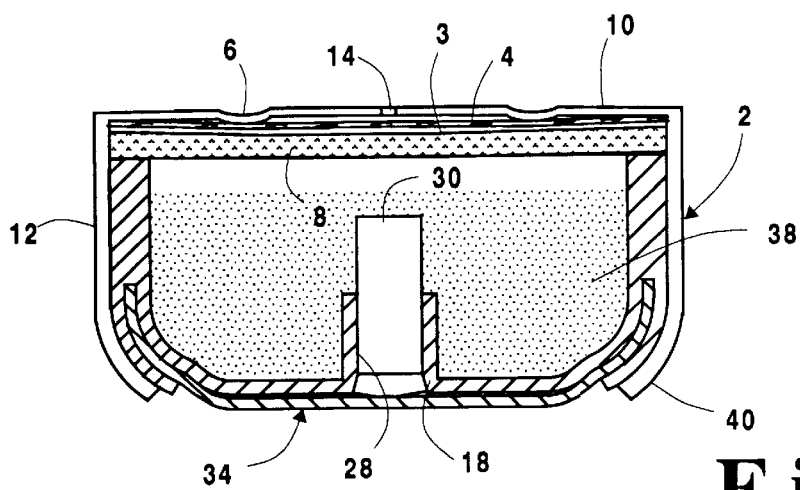
FIG. 5 is a cross-sectional view of the cell of FIG. 4 after the wall of the can was crimped to provide a sealed cell.

As shown in FIG. 5, while the can 2 is inverted, the edge or rim 40 of the can 2 is crimped inwardly. The rim 40 of the can 2 is then compressed against the electrically insulating member 18 which is located between the cup 34 and the can 2 thereby forming a seal and an electrical barrier between the can 2 and the cup 34.

Figure 6:
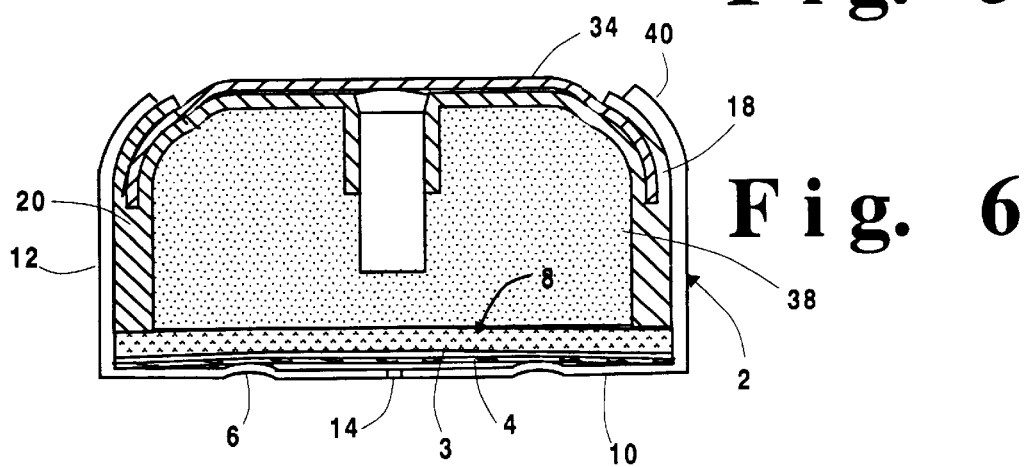
FIG. 6 is a cross-sectional view of the cell of FIG. 5, inverted.

The cell of FIG. 5 is shown inverted in FIG. 6.

As shown in FIGS. 1 and 6, hole 14 is punched into the bottom of can 2 to act as an air-entering port.

It is to be understood that modifications and changes to the preferred embodiment of the invention herein shown and described can be made without departing from the spirit and scope of the invention.

What is claimed:

1. A galvanic cell comprising:
   a) a first electrode having a polarity;
   b) a second electrode of opposite polarity;
   c) a separator between said first electrode and said second electrode;
   d) an electrolyte;
   e) a two-part conductive housing containing said first electrode, second electrode, separator and electrolyte, the first part of said housing being a can having an upstanding wall with an edge defining an opening and being electrically connected to said first electrode, and the second part of said housing being a cup having a peripheral flange and being electrically connected to said second electrode;
   f) an insulating member comprising a base segment, an internal upstanding wall defining an opening in the base segment, and a peripheral wall; wherein the peripheral wall, internal wall and base segment define an internal surface area that contacts said second electrode, the peripheral wall of the insulating member is disposed between the upstanding wall of the can and the flange of the cup, and the edge of the can is sealed against said insulating member thereby securing the can to said insulating member to provide a seal for the cell; and
   g) a current collector member extending through the opening in the base segment of said insulating member and electrically contacting said second electrode at one end and electrically contacting the cup at the other end; said current collector having a surface area disposed within said second electrode of less than 25% of said insulating member's internal surface area.

2. The galvanic cell of claim 1 wherein said insulating member is a plastic member.

3. The galvanic cell of claim 1 wherein the cup and said current collector are a unitary material.

4. The galvanic cell of claim 1 wherein the cup and said current collector are separate members.

5. The galvanic cell of claim 1 wherein said insulating member comprises a base segment, an internal upstanding wall defining an opening in the base segment, a peripheral wall and a groove disposed within the peripheral wall of said insulating member and wherein the flange of the cup is secured in the groove.

6. The galvanic cell of claim 5 wherein the flange of the cup forms a curved segment on the wall of the cup and the depth of the groove formed in the peripheral wall of said insulating member is at least the length of the curved segment of the wall of the cup that is secured in the groove of said insulating member.

7. The galvanic cell of claim 1 wherein said insulating member is made of a unitary solid material.

8. The galvanic cell of claim 1 wherein said insulating member is made of at least two separate segments.

9. The galvanic cell of claim 1 wherein said insulating member is made of a material selected from the group consisting of synthetic rubber, vinylidene fluoride resin, polyamide resins, polyolefin, polyvinyl chloride, silicone, polypropylene and tetrafluoroethylene polymer.

10. The galvanic cell of claim 1 wherein the surface area of said current collector disposed within said second electrode is less than 10% of said insulating member's internal surface area.

11. The galvanic cell of claim 10 wherein the surface area of said current collector disposed within said second electrode is less than 7% of said insulating member's internal surface area.

12. The galvanic cells claim 1 wherein said current collector is a cylinder member.

13. The galvanic cell claim 1 wherein said current collector is a wire.

14. A galvanic cell comprising:
   a) a first electrode having a polarity;
   b) a second electrode of opposite polarity;
   c) a separator between said first electrode and said second electrode;
   d) an electrolyte;
   e) a two-part conductive housing containing said first electrode, said second electrode, said separator and said electrolyte, the first part of said housing being a conductive can having an upstanding wall with an edge defining an opening and being electrically connected to one of the electrodes, and the second part of the housing being a conductive cup having a peripheral flange and an inner surface and being electrically connected to the other electrode;

f) an insulating member comprising a base segment, an internal upstanding wall defining a central opening in the base segment, and a peripheral wall; wherein the base segment of said insulating member is adjacent the inner surface of said cup, the peripheral wall of said insulating member is disposed adjacent the upstanding wall of the can, the peripheral wall of said insulating member has an annular groove disposed therein, the flange of the cup is secured in the groove of the peripheral wall, and the edge of the can is sealed against said insulating member thereby securing the can to said insulating member to provide a seal for the cell; and g) a current collector member extending through the central opening in the base segment of said insulating member and electrically contacting one electrode at one end and electrically contacting the cup at the other end.

15. The galvanic cell of claim 14 wherein said current collector is a separate member selected from the group consisting of wire, nail and cylinder member.

16. The galvanic cell of claim 14 wherein said insulating member is made of a unitary solid material.

17. The galvanic cell of claim 14 wherein said insulating member is made of a material selected from the group consisting of synthetic rubber, vinylidene fluoride resin, polyamide resins, polyolefin, polyvinyl chloride, silicone, tetrafluoroethylene polymer, and-polypropylene.

18. A process for assembling the components of a cell into a two-part conductive housing in which one part is a cup and the other part is a can comprising the steps:

(a) preparing a conductive can with a peripheral wall terminating with an edge defining an opening;

(b) preparing an insulating member having a base segment, a peripheral wall, an internal upstanding wall defining an opening, and a groove disposed in the peripheral wall of the insulating member and said insulating member having an inner surface and an outer surface;

(c) preparing a conductive cup with a peripheral flange and an inner surface;

(d) placing a current collector within and through the opening in the insulating member and securing the cup to the insulating member so that the flange is secured within the groove of the insulating member and the base segment of the insulating member is adjacent the inner surface of the cup;

(e) placing the components of the cell comprising at least two electrodes within the can and cup so that the wall of the can is in parallel alignment with the peripheral wall of the insulating member; and (f) securing the wall of the can against the wall of the insulating member thereby producing a sealed cell.

19. The process of claim 18 wherein the insulating member is made of a material selected from the group consisting of synthetic rubber, vinylidene fluoride resin, polyamide resins, polyolefin, polyvinyl chloride, silicone, tetrafluoroethylene polymer, and polypropylene.

20. The process of claim 18 wherein the surface area of the current collector is less than 25% of the insulating member's internal surface area.

* * * * *